United States Patent [19]

Kennedy

[11] Patent Number: 5,494,291
[45] Date of Patent: Feb. 27, 1996

[54] NARROW RANGE ULTRAVIOLET STABILIZERS IN GOLF BALL COATINGS

[75] Inventor: Thomas J. Kennedy, Chicopee, Mass.

[73] Assignee: Lisco, Inc., Tampa, Fla.

[21] Appl. No.: 93,251

[22] Filed: Jul. 16, 1993

[51] Int. Cl.$^6$ ............................ A63B 37/12; B32B 27/40; C08K 5/3462
[52] U.S. Cl. ................................. 273/235 A; 273/235 R; 273/DIG. 8; 273/DIG. 24; 428/423.1; 428/423.3; 428/423.9; 428/424.4; 524/103; 524/908
[58] Field of Search ........................... 273/235 R, 235 A, 273/DIG. 8, DIG. 24; 428/423.1, 423.3, 423.9, 424.4; 524/103, 908

[56] References Cited

U.S. PATENT DOCUMENTS 5,156,405  10/1992  Kitaoh et al. ................. 273/235 A

*Primary Examiner*—Peter A. Szekely

[57] ABSTRACT

A golf ball having a fluorescent cover and an ultraviolet light blocking, visibly transparent top coat is disclosed. The cover can bear a fluorescent coating or be made of a fluorescent bulk material. The fluorescent material is selected and provided in an amount effective to fluoresce by absorbing at least some ultraviolet light having a wavelength exceeding about 320 nm and emitting visible light. The top coat contains a narrow-spectrum short-wave ultraviolet light absorber. The top coat absorbs more ultraviolet light having a wavelength of about 320 nm than ultraviolet light having a wavelength of about 350 nm, while transmitting a substantial proportion of at least some wavelengths of visible light and ultraviolet light having wavelengths greater than about 320 nm. One particular ultraviolet light blocking material contemplated herein consists essentially of an oxalanilide. This combination of a fluorescent substrate and a short-wave ultraviolet light absorbing top coat is also disclosed to have other utilities as a coating system. The fluorescent material and ultraviolet absorber can also be formulated in a single, substantially homogeneous composition.

13 Claims, 1 Drawing Sheet

NARROW RANGE ULTRAVIOLET STABILIZERS IN GOLF BALL COATINGS

BACKGROUND OF THE INVENTION

This invention relates to visibly transparent coatings. More particularly it relates to transparent golf ball coatings containing particular ultraviolet light absorbers, sometimes known as "U.V. stabilizers," which selectively absorb short-wave ultraviolet light having a wavelength of less than about 330 nm while permitting the passage of longer wavelengths of ultraviolet light and visible light.

The primary source of ultraviolet light is the sun, which emits a broad spectrum of ultraviolet light as well as other wavelengths of light. The spectrum of sunlight consists mainly of wavelengths greater than about 290 nm, having nearly zero intensity at about 290 nm and a maximum intensity at about 530 nm. The spectrum of sunlight is limited by the filtering effect of the earth's atmosphere. Light having a wavelength in the range below about 400 nm is classified as ultraviolet light, while light in the range from about 400 nm to about 800 nm is classified as visible light.

Ultraviolet light causes photodegradation of certain polymeric compounds. Photodegradation of a polymeric material or its constituents is manifested as discoloration (especially yellowing), brittleness, fading of colored material, and other deterioration. In some instances, ultraviolet light absorbers are added to polymers which are exposed to sunlight. The usual ultraviolet light absorbers function by strongly absorbing the ultraviolet light wavelengths of from about 290 nm or less to about 400 nm, while passing visible light. The energy of the absorbed ultraviolet light is released in the form of infrared energy, which is less energetic and does less damage to the substrate containing the ultraviolet absorber than does ultraviolet light. Absorbance above 400 nm is regarded as undesirable unless it is desired to color or darken the material containing the ultraviolet light absorber.

The presence of ambient ultraviolet light in sunlight can be used to advantage by adding fluorescent materials to a polymer composition. The fluorescent materials of greatest interest here absorb at least some wavelengths of ultraviolet light from sunlight (typically ultraviolet light having a wavelength in the range of about 290 to 400 nm), and emit some of the energy of the absorbed ultraviolet light in the form of visible light. (The residual energy from the incident light is dissipated as heat.) As a result, an unusually great amount of visible light is emitted and reflected from a fluorescent surface, providing a brilliant white or colored surface. Fluorescent materials include optical brighteners, which typically emit bluish light, as well as dyes and pigments, which typically emit blue or other wavelengths of light. Fluorescent materials are commonly adapted to absorb ultraviolet light having a variety of wavelengths and to emit visible light having a characteristic wavelength, and thus a characteristic color.

It would be useful to provide a clear-coated substrate in which the coating and substrate are both protected from short-wave ultraviolet light damage, the substrate (which may be either a bulk material or a base coat) is fluorescent, and the coating is transparent to the long-wave ultraviolet and visible wavelengths of sunlight and of the light emitted and reflected from the substrate through the coating. One combination of this kind would be a clear coating which contains an ultraviolet absorber, so both it and the substrate would be protected from damage due to ultraviolet light, and a fluorescent substrate.

This combination would be desirable, for example, in golf balls. Golf balls must be stabilized to prevent their deterioration in ultraviolet light because they are used (and sometimes left for extended periods) outdoors in the sunlight. At the same time, golf balls are desirably brightened or fluorescent so they are both attractive and easily found on a golf course. This combination would also be useful in other plastics, paints and coating systems for outdoor use, such as automobile finishes, synthetic fabrics, and other articles and materials.

It is undesirable to indiscriminately combine or overlay conventional fluorescent materials with transparent top coats containing conventional ultraviolet absorbers. A typical sunlight-excited fluorescent base material absorbs at least some wavelengths of ultraviolet light in the range of from about 290 to about 400 nm to emit visible light, while typical ultraviolet absorbers have been used to absorb the ultraviolet components of sunlight having the same wavelengths. The fluorescent and ultraviolet blocking materials compete to absorb light of the same wavelengths, so stability is obtained at the expense of useful fluorescence.

The prior art discloses materials containing ultraviolet absorbers and other materials containing fluorescent materials, but does not address the fundamental conflict if both ingredients are used indiscriminately in the same composition, or in a transparent top coat and a substrate for the top coat.

SUMMARY OF THE INVENTION

One object of the invention is to provide a golf ball or other coated article having a fluorescent cover or substrate and a top coat. The top coat is substantially transparent to some of the ultraviolet light which can cause the cover to fluoresce and to the light emitted and reflected from the cover.

An alternate object of the invention is to provide a fluorescent material and an ultraviolet light absorbing material in the same composition, thus absorbing at least some ultraviolet light having shorter wavelengths while passing at least some of the ultraviolet light which causes the fluorescent material to fluoresce.

Still another object of the invention is to provide a substrate and top coat combination in which the substrate and the top coat are stabilized against degradation by sunlight.

Yet another object of the invention is to provide a top coat which passes a substantial proportion of light having a wavelength greater than about 320 nm, including a substantial proportion of at least some wavelengths of visible light, while blocking the passage of short-wave ultraviolet light having a wavelength of about 320 nm and less.

One or more of the foregoing objects, or other objects which will become apparent to a person of ordinary skill in the art upon reading the present specification, are satisfied by the present invention.

One aspect of the invention is a golf ball having a fluorescent cover and an ultraviolet light blocking, visibly transparent top coat.

The cover can bear a fluorescent coating or be made of a fluorescent bulk material. The fluorescent material is selected and provided in an amount effective to fluoresce by absorbing ultraviolet light having a wavelength above about 320 nm and emitting visible light. A wide variety of fluorescent materials can be used alone or together in a variety of proportions to accomplish this result.

The top coat contains a narrow-spectrum short-wave ultraviolet light blocker. The top coat absorbs a substantial proportion of short-wave ultraviolet light having a wavelength of about 320 nm and less while transmitting a substantial proportion of at least some wavelengths of visible light and ultraviolet light having a wavelength greater than about 320 nm. One particular ultraviolet light blocking material contemplated herein consists essentially of an oxalanilide.

This combination of a fluorescent substrate and a short-wave ultraviolet light absorbing top coat is also contemplated to have other utilities as a coating system.

DETAILED DESCRIPTION OF THE PREFERRED EMBODIMENT

Figure 1:
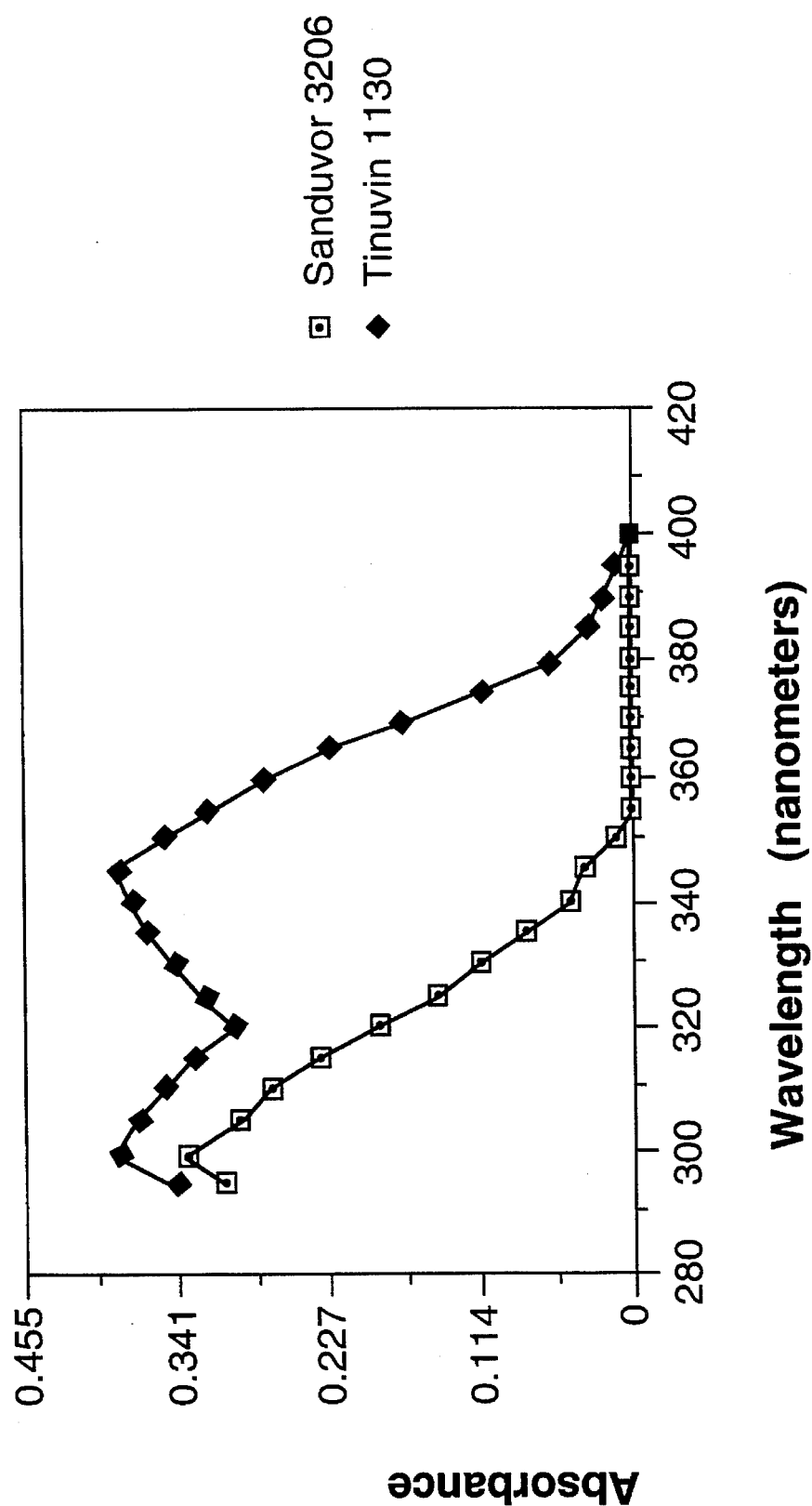
FIG. 1 is a composite absorbance spectrum for TINUVIN-1130 and SANDUVOR 3206—two ultraviolet light absorbers—in tetrahydrofuran, with the tetrahydrofuran spectrum subtracted.

The present invention will be exemplified by a golf ball having a fluorescent cover coated with a substantially visibly transparent top coat or gloss coat which contains a short-wave ultraviolet light absorber. In the embodiment described here, a primer is interposed between the top coat and the cover to unite them.

Cover

First, a covered golf ball is provided. The cover is typically made of an ionomer resin such as SURLYN (a trademark of E. I. DuPont De Nemours & Co., Wilmington, Del.) or IOTEK (a trademark of Exxon Chemical Co., Polymers Group, Baytown, Tex.); or can be made of balata (a natural resin) or a thermoplastic polyurethane. In some golf balls, particularly ionomer resin balls, the material of the cover is pigmented in bulk with titanium dioxide or other whiteners, and optionally colored materials. The specific nature of the cover material is not regarded as critical herein; conventional materials may be used.

In the present embodiment, fluorescent materials, which include colored dyes and pigments as well as brighteners, are desirably used in the cover formulation. Other balls are painted, so some or all of the pigments and fluorescent materials can be formulated in the paint.

The brighteners useful herein include any of the materials identified in Kirk-Othmer, Encyclopedia of Science and Technology (3d Ed.), Volume 4, pages 213 to 226 and the references identified therein, which are hereby incorporated herein by reference. The contemplated materials are particularly those which fluoresce, emitting visible light when exposed to ultraviolet light somewhere in the range exceeding about 320 nm. Some specific trade names of optical brighteners useful herein are ULTRAPHOR SF-PO, LUMOGEN F Violet 570, UVITEX OB, UVITEX FP, others identified by trade name or chemical constitution in U.S. Pat. No. 5,110,835, which is hereby incorporated herein by reference, and others identified in U.S. Pat. No. 4,679,795, issued to Melvin et al. on Jul. 14, 1987. That patent is hereby incorporated herein by reference. Still another brightener contemplated herein is LUCOPURE EGM, a coumarin optical brightener sold by Sandoz Chemicals Corporation, Charlotte, N.C.

Other fluorescent dyes and pigments which color the cover composition and are suitable for incorporation in the substrate are contemplated for use herein. Exemplary fluorescent colorants are identified in Kirk-Othmer, Encyclopedia of Science and Technology (3d Ed.), Volume 14, pages 546–569, which is hereby incorporated herein by reference.

Representative cover compositions which incorporate fluorescent brighteners are disclosed in the Melvin et al. patent previously incorporated by reference.

Primer

For golf balls having a cover made of an ionomer having a relatively high zinc content, a cover made of thermoplastic polyurethane, or a cover made of mixtures of ionomers and polyurethanes, a primer coat may not be necessary. Thus, the top coat can be applied directly to the cover of the ball with good adhesion. Also, the urethane coatings herein having a relatively high index exhibit very good adhesion to the golf ball cover without the need for a primer coat. For a typical golf ball, however, a primer coat is applied to the cover to promote the adhesion of the top coat to the golf ball.

The primers useful herein may be formulated as follows. From about 90% by weight to about 96% by weight, preferably about 90% by weight, of a water-borne dispersion of a resin selected from the group consisting of acrylic resin, polyurethane resin, and combinations thereof can be combined with from about 4% to about 10% by weight, preferably about 5% by weight, of a polyfunctional aziridine crosslinker material. (All percentages here and elsewhere are by weight unless otherwise specified. As used here, "dispersion" includes colloidal emulsions, latices, and other dispersed forms of the composition.) The waterborne resin dispersion used in the primer may be an acrylic emulsion or lacquer, for example a material sold by Zeneca Resins Division of Imperial Chemical Industries, PLC, of Wilmington, Del. under the trademark NeoCryl. Particular materials of this type include NeoCryl A-601 and NeoCryl B-723, among others.

The waterborne resin dispersion used in the primer may instead be a polyurethane prepolymer emulsion, for example a material sold by Zeneca under the trademark NeoRez. A specific NeoRez dispersion useful herein is NeoRez R-960 emulsion. Another material which may be used is WITCO-BOND W-234, a waterborne polyester polyurethane suspension supplied by Witco, Organics Division, Chicago, Ill.

Combinations of acrylic and polyurethane dispersions are also contemplated within the scope of the present invention. The water-borne dispersions contemplated herein contain from about 5% to about 90% solids, preferably from about 20% to about 40% solids.

One of ordinary skill in the art is readily able to select a resin dispersion which is useful in a primer for the ball cover materials specified above.

The polyfunctional aziridine crosslinker materials useful herein are preferably tri- or more highly functional compounds. The preferred materials include: pentaerythritol-tris-(β-(N-aziridinyl) propionate); trimethylolpropane-tris-(β -(N-aziridinyl)propionate); mixtures of different polyfunctional aziridines identified in U.S. Pat. No. 5,057,371 (for example, from column 3, line 45 to column 5 line 19); the polyaziridine materials identified in U.S. Pat. Nos. 5,091,239 and 4,842,950; and other polyfunctional aziridines. The patents listed in this paragraph are hereby incorporated herein by reference in their entireties to exemplify polyfunctional aziridines. Representative polyfunctional aziridines which are useful herein are sold under the trade designations CX-100; XAMA-2; and XAMA-7 by the manufacturers listed in the patents previously incorporated by reference.

The present primer compositions may include flatting agents, for example, fumed silica and talc. Commercially available flatting agents are sold as OK-412 by Degussa Corporation, Peterboro, N.J.; as TS900 by the same company; and as Lo-Vel 27 by PPG Industries Inc., Chemical Group, Pittsburgh, Pa.

The present primer compositions may include small amounts of surfactants where necessary to control orange peel, cratering, and edge pull. Excessive amounts of surfactants may interfere with adhesion of the primer. Examples of surfactants useful herein are sold as FLUORAD FC-120 and FC-129 fluorocarbon surfactants by 3M Company, St. Paul, Minn.; as EMCOL 4500 modified polydimethylsiloxane paint surfactant by Witco; and as AEROSOL OT-75 bis-(2-ethylhexyl)-S-sodium sulfasuccinate surfactant by American Cyanamid.

The present primer compositions may include solvents, for example, M-pyrol, sold by GAF Corporation, New York City, N.Y.; Cellosolve solvents sold by Union Carbide Corporation, Coatings Materials Division, New York City, N.Y.; butyl acetate; and propylene glycol.

The primers contemplated herein may contain flow agents, for example BYK 346 modified polydimethylsiloxane flow agent sold by BYK-Chemie, U.S.A., Wallingford, Conn..

The present primer compositions may include thickeners, for example, polyacrylic materials, cellulosic materials, and certain solvents which thicken the present compositions. Commercially available materials of this kind are sold as UCAR SCT 100; as QR 1001 by Rohm & Haas; as PARA-GUM 147 by Para-Chem Inc., Philadelphia, Pa.; as ACRA-MIN Thickener 6 by Verona Dyestuff Division of Miles Chemical Corporation, Union, N.J.; as ACRYSOL polyacrylates by Rohm & Haas Company; as METHOCEL by Dow Chemical Company, Midland, Mich.; or as NATRASOL by Hercules, Inc., Wilmington, Del.

The present primer compositions can contain defoamers. Commercially available materials of this kind are sold as SWS 211 silicone defoamer by SWS Silicones Corporation, Adrian, Mich.; and as BALAB BUBBLE BREAKER 748 or 3056-A modified polydimethylsiloxane surfactant by Witco.

One primer composition found herein to be particularly useful is one containing Witcobond W- 234, CX-100, and BYK 346, each as identified above.

Another useful primer composition consists essentially of from about 90% by weight to about 99% by weight of a water-borne dispersion of acrylic resin or polyurethane resin or both and from about 1% to about 10% by weight of a polyfunctional aziridine. If the primer lies between or covers the ultraviolet light blocking material and the fluorescent material, it should be substantially transparent to the same wavelengths as those to which the top coat is transparent.

The primer is applied at a thickness of from about 7 to about 50 microns and dried and cured, leaving a cured coating from about 5 to about 25 microns thick.

Top Coat

The primed or unprimed cover is coated with a visibly transparent top coat. The top coat is hard and resilient, and imparts a high gloss to the ball.

Apart from the selection of a ultraviolet light blocking agent and optionally a fluorescent pigment or dye, the top coat materials useful herein are well known. The top coat, commonly a polyurethane coating, may be prepared either as one part, or as two parts which require the mixing of a "part A" polyol composition with a "part B" di- or polyisocyanate, biuret, or isocyanurate curing agent.

Part A of the polyurethane is contemplated to be a hydroxy functional polyol with a hydroxyl equivalent weight of from about 50 to about 1500, preferably 200 to 500. Specific hydroxy functional polyols contemplated herein are polyesters, polyethers, or acrylics. Polyols marketed by Miles Corporation, Coatings Division, Pittsburgh, Pa. under the trademarks DESMOPHEN and MULTRON are particularly contemplated for use herein. One such resin is Miles Desmophen 651-A-65 saturated polyester polyol.

In addition to these polyhydroxyl compounds, other materials containing a reactive hydrogen atom that would react with an isocyanate or isocyanurate group to form a polyurethane can be utilized. Such materials include polyamines, polyamides, short oil alkyds, castor oil, epoxy resins with secondary hydroxyl groups, phenolic resins, and hydroxyl functional vinyl resins. Suitable examples of such materials include Ancamine 2071, a modified polyamine marketed by Pacific Anchor Chemical Corporation, Los Angeles, Calif., EPON V-40, a polyamide marketed by Shell Chemical Company, Houston, Tex., Aroplaz, 1133-X-69, a short oil alkyd marketed by Spencer Kellogs Products Div., Reichhold Chemicals Inc., Minneapolis, Minn., EPON resin 828, an epoxy resin marketed by Shell Chemical Company, Pentalyn 802A, a phenolic modified polyester resin marketed by Hercules Inc., Wilmington, Del., and VMCA, a hydroxyl functional vinyl resin marketed by Union Carbide, Danbury, Conn.

Co-reactants can be incorporated into the polyol portion of the coating system. Such co-reactants can be either compositions that further polymerize with heat or compositions that form a film after the solvent is evaporated during the polyurethane polymerization process. Such materials do not react with the isocyanate or isocyanurate portion of the coating system, but instead act independently to improve the final coating properties. Exemplary constituents contemplated here include acetate butyrates, low molecular weight acrylic resins, and polyvinyl chloride/polyvinyl acetate copolymers. A suitable polymerizing material for use herein is CYMEL 303, a melamine resin sold by American Cyanamid. An example of a suitable film-forming resin is A-101, an acrylic, non-hydroxyl containing resin sold by Rohm & Haas, Philadelphia, Pa.

The hydroxyl functional polyol is carried in a solvent, with the solvent solution containing from about 15 to 35% by weight of the polyol solids. Suitable solvents for use herein include the known polyurethane solvents, for example, butyl acetate, methyl isobutyl ketone, methyl amyl ketone, propylene glycol, monomethyl ether acetate, and mixtures thereof. More generally, esters, ketones, ether esters, or aromatic hydrocarbons such as toluene, xylene, or higher-boiling aromatic hydrocarbons are commonly suitable for use herein, depending on the isocyanate selected. Especially preferred as the solvent or co-solvent is methyl amyl ketone because its high dipole constant permits a greater amount of polyol or other resin solids to be dispersed therein.

Other additives can be included in part A of the polyurethane system. These additives include ultraviolet light stabilizers and absorbers, leveling agents, optical brighteners and other fluorescent materials, mar and slip agents, catalysts, antioxidants, defoaming agents, and pigments, fillers, and extenders.

Suitable leveling agents which reduce the surface tension of the coating for improved coating flow include Fluorad FC-430, a fluorochemical surfactant sold by 3M Industrial Chemical Products Division, St. Paul, Minn., and DOW 57, a silicone additive sold by Dow Corning Corporation, Midland, Mich.

Pigments contemplated for use herein, if any, include titanium dioxide, iron oxides, nickel and chrome titanates, chrome yellow, cadmium types, carbon black, chrome oxide green types, phthalocyanine blue or green, perylene and quinacridone types, and other conventional pigments. Extenders contemplated for use herein, if any, include barytes, heavy spar, microtalc, kaolin, micaceous iron oxide, magnesium mica, quartz flour, powdered slate, and silicon carbide. The present compositions are preferably sufficiently free of pigments and extenders to remain transparent to the previously mentioned wavelengths of ultraviolet and visible light.

Ultraviolet light absorbers, also known as UV stabilizers, function to tie up free radicals in the top coating that are produced upon exposure to ultraviolet radiation, thus maintaining the integrity of the coating. The ultraviolet light absorbers useful herein for the top coat composition are contemplated to be any materials which have higher absorbance for ultraviolet light, preferably at least twice as high, more preferably have an absorbance at least five times as high, still more preferably have an absorbance at least about ten times as high, at a wavelength of about 320 nm as the same material in the same medium has at a wavelength of about 350 nm (after subtracting the spectrum of the medium). The top coat should also absorb little of the visible light emitted by the fluorescent material, and preferably (particularly for a white ball) should be colorless or slightly blue if the cover alone is otherwise somewhat yellow.

Specific ultraviolet light absorbers contemplated herein include those found in Kirk-Othmer, Encyclopedia of Science and Technology (3d Ed.), Volume 23, pages 615–627 and the references cited therein, which are hereby incorporated herein by reference, which have the specified absorption and transmission characteristics. Particular materials which are contemplated to be useful herein include 2-ethoxy-4'-isododecyloxalanilide, 2-ethyl- 2'-ethoxy-5'-t-butyloxalanilide, 2-ethyl-2'-ethoxyoxalanilide, and combinations thereof. Commercial materials of this sort include SANDUVOR 3206, and SANDUVOR 3052 sold by Sandoz Color and Chemicals. Sanduvor 3206 is useful in the range of 0.1–3.0 phr with a preferred range of 0.5–2.0 phr.

The brighteners and fluorescent materials previously identified with reference to the cover composition can also or instead be incorporated into the top coat composition.

The additives and co-reactants typically constitute from 0 to about 20% by weight of the total coating system. Preferably they are added as from about 1–5% by weight of the total coating system.

Part B of the polyurethane is contemplated to be a biuret, isocyanate, or isocyanurate functional monomer or prepolymer. Specific materials of these kinds contemplated for use herein are hexamethylene diisocyanate, methylene diisocyanate, toluene diisocyanate, isophorone diisocyanate, or their biurets or isocyanurates, such as the biuret or trimer of hexamethylene diisocyanate. Isocyanates suitable for use herein are sold by Miles under the trademark DESMODUR. The active ingredients of the "part B" material utilized in the present invention desirably have a viscosity within the range of from about 3 to about 10,000 cps, with the preferred range being from about 50 to about 5,000 cps.

The isocyanate or isocyanurate equivalent weight of the crosslinking agent used herein is desirably from about 100 to about 1,200, with from about 100 to about 600 or especially from about 150 to about 300 being preferred. The crosslinking agent is carried in a solvent, with the solvent solution containing from about 15 to 30% by weight of the biuret or trimer. Suitable solvents for the crosslinking agent include methyl isobutyl ketone, methyl amyl ketone, butyl acetate and propylene glycol monomethyl ether acetate.

Part A of the polyurethane coating system containing the polyol and other additives is mixed with Part B of the coating system at an index or ratio of N=C=O to OH in the range of 0.90 to 1.5, with an index range of 0.95 to 1.2 being preferred. An index of 1.05 is most preferred since it takes into account any water that may be present in the polyol, and water vapor present in the air. The excess isocyanate insures that all of the polyol will be polymerized, with any excess isocyanate being converted to a polyurea. If any excess polyol is present, it will not polymerize and tends to act as a plasticizer, thus resulting in a coating of decreased hardness. When the two parts of the coating system are combined, the total system has the following general formulation:

| | |
|---|---|
| Polyol and isocyanate or isocyanurate | 35–90% |
| Solvent | 0–65% |
| Additives and/or co-reactants | 0–20% |

One "A" portion of a top coat composition contemplated herein comprises the following ingredients:

| | |
|---|---|
| DESMOPHEN 651-A-65 | 100.00 phr |
| Toluene | 50.00 phr |
| Butyl Acetate | 80.00 phr |
| Methyl Amyl Ketone | 20.00 phr |
| 3M FC-430 | 0.20 phr |
| SANDUVOR 3206 | 1.00 phr |
| SANDUVOR 3052 | 0.50 phr |
| UVITEX OB | 0.05 phr |

Another "A" composition contemplated herein comprises the following ingredients:

| | |
|---|---|
| DESMOPHEN 651-A-65 | 100.00 phr |
| Toluene | 50.00 phr |
| Butyl Acetate | 80.00 phr |
| Methyl Amyl Ketone | 20.00 phr |
| 3M FC-430 | 0.20 phr |
| SANDUVOR 3206 | 1.00 phr |
| SANDUVOR 3052 | 0.50 phr |

Yet another "A" composition contemplated herein comprises the following ingredients:

| MATERIAL | AMOUNT (pbw) |
|---|---|
| Desmophen 651A-65 | 100.0 |
| Desmophen 670-80 saturated polyester polyol | 30.0 |
| Butyl Acetate | 35.0 |
| Methyl isobutyl ketone | 10.0 |
| Methyl amyl ketone | 50.0 |
| FC-430 | 0.3 |
| Sanduvor 3206 | 2.0 |

-continued

| MATERIAL | AMOUNT (pbw) |
| --- | --- |
| Tinuvin 292 | 1.0 |
| Uvitex OB | 0.1 |

In the above compositions, Sanduvor 3052 is a free-radical scavenger sold by Sandoz as previously identified.

One "B" portion of a top coat composition contemplated herein comprises the following ingredients:

| MATERIAL | AMOUNT (pbw) |
| --- | --- |
| Desmophen N-3200 bioret of hexamethylene diisocyanate | 67.0 |
| Methyl isobutyl ketone | 40.0 |

Finishing Golf Balls

Golf balls having ionomer covers can be finished as follows. If a primer is used, the balls can be coated with the primer using an air-atomizing sprayer, dried, then cured in a curing oven. If desired, the legend stamp identifying the ball may be applied to the primer, which helps the legend to adhere to the ball.

Then the top coat is applied. Whether the top coat is applied directly to the cover or to a primer coat, it is preferably applied by spraying the coating onto the ball. One method of spraying the coating is as follows:

The "A" and "B" portions of the top coat are premixed in a pressure pot. Dry air is used to push the coating to an air atomizing spray gun where it is forced out of a small diameter (0.1 inches) fluid nozzle. The material is then atomized at the tip of the gun by the air cap, again using dry air. This forms a fan of fine droplets that impinge upon the surface of the golf ball.

The top coat is applied at a thickness of from about 7 to about 75 microns. The golf balls are then placed in a 130° F. oven for six hours where the solvent evaporates and the top coat cures, leaving a cured top coat from about 5 to about 50 microns thick. Alternatively, the final cure may be carried out by drying the balls at room temperature for about 24 hours. The result is an adherent finish.

An alternate embodiment of the invention is the combination in a single composition of a fluorescent material which fluoresces by absorbing at least some ultraviolet light having a wavelength in some range greater than about 320 and emitting visible light, and an ultraviolet light absorbing material which absorbs more ultraviolet light having a wavelength of about 320 nm than light having a wavelength of about 350 nm, as defined previously. For example, the cover or top coat of a golf ball or another object can contain both a fluorescent material and a short-wave ultraviolet light absorber in a homogeneous composition. That composition can be made by modifying any of the brightened compositions disclosed in the Melvin et al. patent, adding SANDUVOR 3206 in the range of 0.1–3.0 phr, with a preferred range of 0.5–2.0 phr.

EXAMPLE 1

TINUVIN 1130, a substituted hydroxyphenyltriazole ultraviolet light absorber sold by Ciba-Geigy Corporation, Ardsley, N.Y., and SANDUVOR 3206 were respectively dissolved in tetrahydrofuran to plot- their absorbance spectra from 290 nm to about 600 nm. Spectra of each compound for a solution containing an active ingredient at $1.13 \cdot 10^{-5}$ g/ml are shown in FIG. 1, for which each cell path length was 1 cm. The tetrahydrofuran spectrum was subtracted from the respective plots to give a resultant plot for the active material alone in each case.

The plot for SANDUVOR 3206 differs markedly from that of TINUVIN 1130 between about 330 nm and about 400 nm, and differs little from that of TINUVIN 1130 below about 320 nm and above 400 nm. In the long-wave ultraviolet range of from about 330 nm to about 400 nm, as well as above 400 nm, SANDUVOR 3206 is reasonably transparent, while SANDUVOR 3206 strongly absorbs ultraviolet light between about 290 nm and 330 nm.

Based on this work, it has been estimated that the ultraviolet beam (in the ultraviolet absorbance beam measurement on the solutions described in this example) passed through about $7 \cdot 10^{-6}$ grams of each ultraviolet absorber when the absorption spectra were produced using a 0.6 cm$^2$ beam cross-section. Assuming a 0.6 cm$^2$ cross-section, a 15 micron thick cured top coat film, the presence of 1% of the ultraviolet light absorber in the top coat, and a density of 1.0, the same ultraviolet beam would pass through about $9 \cdot 10^{-6}$ grams of the ultraviolet absorber when passing through the top coat of a golf ball. The ultraviolet light absorbers in the coating would absorb about 9/6.78, or about 1.3 times, as much light of a given wavelength as the same materials dissolved in the solutions represented in FIG. 1. Thus, for example, absorbance of 0.60 by the ultraviolet light absorber in solution would translate to absorbance of about 0.78 by the ultraviolet light absorber in a golf ball top coat, under all the conditions specified above.

EXAMPLE 2

The performance of an ultraviolet absorber can differ markedly when the absorber is in a polymer composition. The other ingredients of the composition also absorb, transmit, and reflect light, while the fluorescent materials have absorbance and emission spectra which must be considered. A further investigation was therefore carried out to determine whether the different absorbance spectra of TINUVIN 1130 and SANDUVOR 3206 would translate into golf balls with markedly different light emissions.

Three types of white golf balls were prepared. Each ball was made with a cover containing UVITEX OB as the optical brightener. Each ball was primed, top coated, dried and cured in the usual manner. The ultraviolet light stabilizers and brighteners used in the top coats of the respective balls were as follows:

| BALL TYPE | TINVUIN 1130 | SANDUVOR 3206 | UVITEX OB (brightener) |
| --- | --- | --- | --- |
| Type 1 | none | none | 0.03% |
| Type 2 | 0.6% | none | 0.03% |
| Type 3 | none | 0.6% | 0.03% |

The samples of Type 1 were thus controls with no ultraviolet absorber, the samples of Type 2 contained TINUVIN 1130 as a absorber, and the samples of Type 3 contained SANDUVOR 3206, according to the present invention, as a absorber.

Fluorescence spectroscopy was used to determine the spectrum emitted by a sample when the outer surface of each ball was excited, in independent trials, with 320 nm light or with 350 nm light. In each case the intensity of the emitted light was calibrated for the control and was greatest for all samples at about 435 nm. The results are provided in Table I below:

TABLE I

| | Average Fluorescence Intensity | |
|---|---|---|
| | Excitation Wavelength | |
| Ultraviolet Absorber | 320 nm | 350 nm |
| CONTROL (none) | 76 units | 65 |
| TINUVIN 1130 | 18 | 14 |
| SANDUVOR 3206 | 28 | 46 |

The control ball containing no absorber whatever in its top coat had the highest emission intensity. Of the two treated balls, the one containing TINUVIN 1130 always had lower emission, but particularly when excited at 350 nm. At the latter excitation wavelength, the SANDUVOR 3206 ball emitted more than three times as much visible light, on average.

This example illustrates that the selection of a particular ultraviolet light blocking ingredient in the top coat has a great effect on the fluorescence of the underlying cover of a golf ball. Oxalanilide ultraviolet absorbers are shown to be superior, particularly when 350 nm wavelength exciting radiation (which is more plentiful in sunlight than lower wavelengths) is used to excite fluorescence in the samples.

Conclusion

A golf ball has been described which has a fluorescent cover and a clear top coat on the cover. The top coat contains an ultraviolet absorber which is selected to absorb more of the incident radiation at a wavelength of about 320 nm than at a wavelength of about 350 nm. A similar coating system can be used to finish other articles, and the ultraviolet light absorber and fluorescent pigment or dye can alternatively be combined in the same formulation. The result is a brighter, more stable ball.

I claim:

1. A golf ball comprising a core and at least one outer layer, said at least one outer layer consisting essentially of:
   A. a fluorescent material that fluoresces by absorbing at least some ultraviolet light having a wavelength greater than about 320 nm and emitting visible light; and
   B. an ultraviolet light blocking, visibly substantially transparent top coat consisting essentially of an ultraviolet light absorber and a carrier, wherein said ultraviolet light absorber absorbs more ultraviolet light having a wavelength of about 320 nm than ultraviolet light having a wavelength of about 350 nm;
wherein said fluorescent material is viewed through at least a portion of said top coat.

2. The golf ball of claim 1, wherein said absorber consists essentially of an oxalanilide.

3. The golf ball of claim 1 wherein said absorber consists essentially of 2-ethoxy-4-isodedecyloxalanilide.

4. The golf ball of claim 1 wherein said carrier is a polyurethane composition.

5. The golf ball of claim 1, wherein said ultraviolet light absorber has an absorbance at least about twice as great for ultraviolet light having a wavelength of about 320 nm as for ultraviolet light having a wavelength of about 350 nm.

6. The golf ball of claim 1, wherein said ultraviolet light absorber has an absorbance at least about five times as great for ultraviolet light having a wavelength of about 320 nm as for ultraviolet light having a wavelength of about 350 nm.

7. The golf ball of claim 1, wherein said ultraviolet light absorber has an absorbance at least about ten times as great for ultraviolet light having a wavelength of about 320 nm as for ultraviolet light having a wavelength of about 350 nm.

8. The golf ball of claim 1, wherein said fluorescent material defines a substrate and said top coat envelops said substrate.

9. The golf ball of claim 1, wherein said fluorescent material and said ultraviolet light blocking material are each disposed in a single, substantially homogeneous composition.

10. An article having a coating said coating consisting essentially of:
   A. a fluorescent material that fluoresces by absorbing at least some ultraviolet light having a wavelength greater than about 320 nm and emitting visible light; and
   B. an ultraviolet light blocking, visibly substantially transparent top coat consisting essentially of 100 phr of a resinous vehicle and from about 0.1 to about 3.0 phr of an ultraviolet blocking agent consisting essentially of an oxalanilide;
wherein said fluorescent material is viewed through at least a portion of said top coat.

11. The article of claim 10, wherein said oxalanilide is 2-ethoxy-4'-isododecyloxalanilide.

12. The article of claim 10, consisting essentially of from about 0.5–2.0 phr of said oxalanilide.

13. The coated article of claim 10, wherein said resinous vehicle consists essentially of a polyurethane composition.

* * * * *